UNITED STATES PATENT OFFICE.

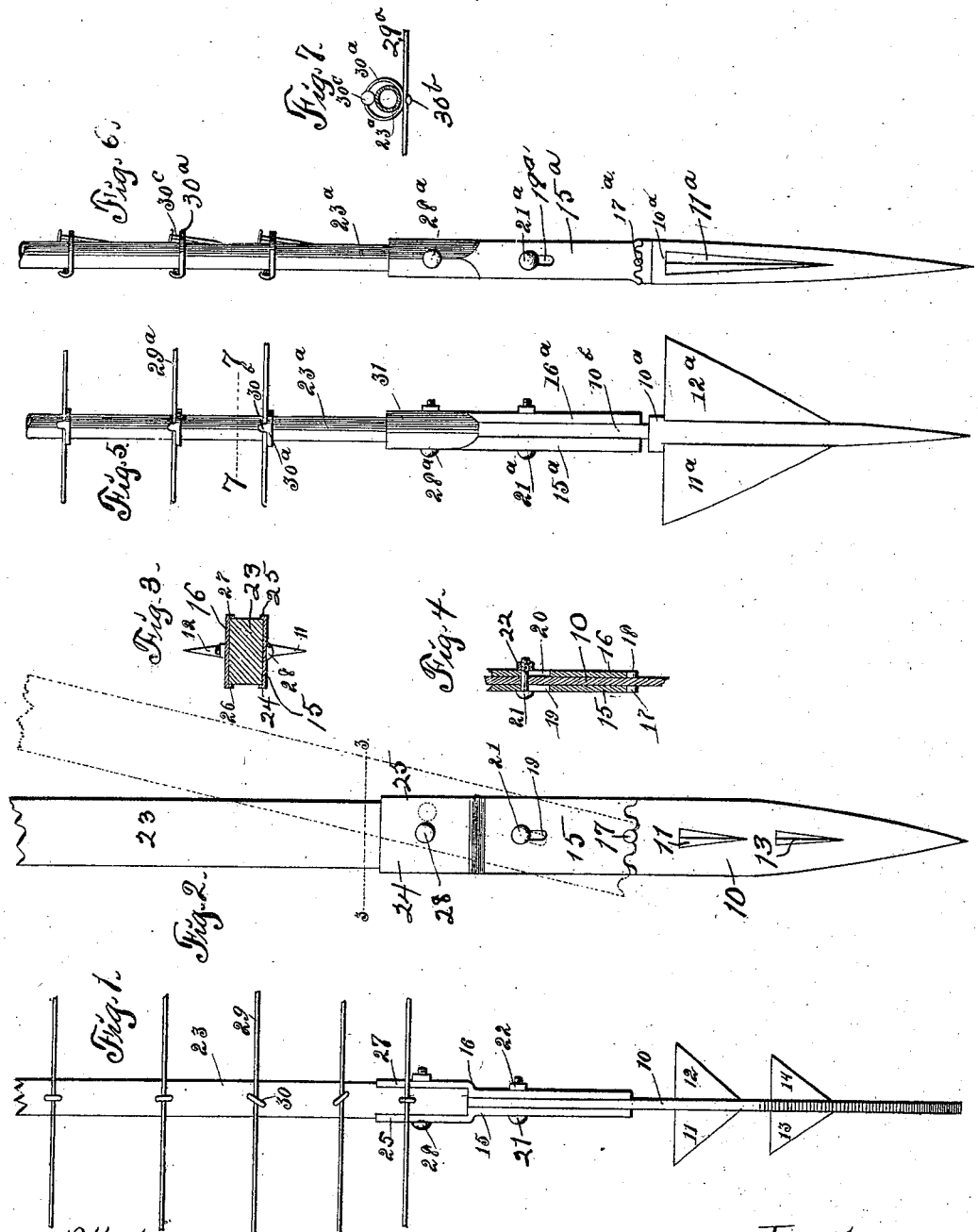

CHARLES R. PRICE, OF DES MOINES, IOWA.

FENCE-POST.

SPECIFICATION forming part of Letters Patent No. 684,096, dated October 8, 1901.

Application filed February 5, 1901. Serial No. 46,118. (No model.)

*To all whom it may concern:*

Be it known that I, CHARLES R. PRICE, a citizen of the United States of America, and a resident of Des Moines, in the county of Polk and State of Iowa, have invented a new and useful Fence-Post, of which the following is a specification.

The object of this invention is to provide improved means for sustaining fence wires or boards in such manner as to be inclined from a vertical plane or laid down upon the ground on either side of the vertical, provision being made for sustaining the fence-wires rigidly in a vertical plane or in inclined planes.

A further object of my invention is to provide means for combining a metallic post or stake arranged and shaped to be driven into the ground with a wooden post or stake arranged to be carried by the metallic post or stake and support the fence-wires.

My invention consists in the construction, arrangement, and combination of elements hereinafter set forth, pointed out in my claims, and illustrated by the accompanying drawings, in which—

Figure 1 is a front elevation of a post and fence-wires attached thereto. Fig. 2 is a side elevation of the post shown in Fig. 1. Fig. 3 is a cross-section of the post on the indicated line 3 3 of Fig. 2. Fig. 4 is a detail vertical section illustrating the hinge of the post. Fig. 5 is a front view of a post of modified form. Fig. 6 is a side view of the post shown in Fig. 5. Fig. 7 is a cross-section of the post on the indicated line 7 7 of Fig. 5.

In the construction of the device as shown the numeral 10 designates a stake or post, made of metal, relatively thin and broad and formed with an attenuated lower end portion or point. The post or stake 10 is provided with wings or blades 11, 12, 13, and 14, formed on or fixed to the central portion of the broad faces thereof and extending outwardly therefrom. The wings or blades are relatively thin and broad and of approximately triangular shape and arranged to penetrate the soil readily and present a blunt upper end portion to resist withdrawal from the soil. Hinge-plates 15 16 are provided and formed with serrated or notched lower end portions, there being three or more notches in the lower end of each of said plates. The hinge-plates 15 16 are arranged parallel with each other on opposite sides of and in contact with the broad faces of the upper end portion of the stake or post 10, and one or the other of the notches in the lower end of each of said plates engage studs or lugs 17 18, formed on or fixed to the stake or post 10 and extending outwardly from the broad faces thereof. Slots 19 20 are formed in and longitudinally of the central portions of the hinge-plates 15 16, and a bolt 21 is mounted through said slots and through an aperture in the upper portion of the stake or post 10. The bolt 21 may be secured by a nut 22 engaging the outer face of the hinge-plate 16, or it may be riveted to said plate, if desired. It is the function of the bolt 21 to connect the hinge-plates 15 16 to the post or stake 10 and at the same time serve as a pivot for said hinge-plates when it is desired to incline or horizontally position said plates. The slots 19 20 are provided in the hinge-plates to permit upward movement of said plates to a degree sufficient to release the engagement between the notched lower ends thereof and the studs or lugs 17 18 when it is desired to shift or alter the position of the post. The upper end portions of the hinge-plates 15 16 diverge or are spread slightly and to a degree necessary to permit the insertion between them of the lower end portion of a post 23. Lips or marginal flanges 24, 25, 26, and 27 are formed on and extend outwardly from the edges of the upper portions of the hinge-plates 15 16 and overlap, brace, and sustain the post 23 relative to said plates. A bolt 28 is mounted in coinciding apertures transversely of the upper end portions of the hinge-plates 15 16 and the lower end portion of the post 23, and by means of said bolt said post is rigidly yet detachably mounted in the socket formed by said plates. The post 23 preferably is of wood and angular in cross-section to fit the socket formed by the upper end portions of the hinge-plates 15 16 and fence-wires 29, or boards or slats may be attached to said post in any desired manner, such as by the use of staples 30, nails, or screws.

In Figs. 5, 6, and 7 I have illustrated a post or stake 10ª, preferably circular in cross-section and formed with a flattened stem 10ᵇ, comprising its upper end portion. The post or stake 10ª is provided with wings or blades 11ª 12ª of materially larger dimensions than either of the wings or blades of the stake or post 10, which wings or blades are formed on or fixed to the periphery of the circular portion of the stake or post and extend radially therefrom in opposite directions and from diametrically opposite points. I also have provided hinge-plates 15ª 16ª, notched in their lower end portions for engagement with a stud or lug 17ª, and another opposite thereto (not shown) formed on or fixed to the flattened stem 10ᵇ and extending outwardly therefrom in opposite directions. I have provided the hinge-plates 15ª 16ª with slots to receive a bolt 21ª, also traversing a hole in the upper end portion of the stem 10ᵇ, by such construction permitting the same adjustment vertically and laterally as is permitted in the device illustrated in Figs. 1, 2, 3, and 4. I have arranged and shaped the upper end portions of the hinge-plates 15ª 16ª to form when combined a socket 31, circular in cross-section, to receive the lower end portion of a post 23ª, also circular in cross-section. The post 23ª may be of wood or metal, preferably of gas-pipe or tubing, and is secured to the socket 31 by a bolt 28ª, mounted in coinciding apertures in said socket and the lower end of the post. Rings 30ª are mounted on and encircle the post 23ª, and each of said rings is formed with a tongue or lip 30ᵇ, extending laterally and inwardly from one side thereof. Strand-wires 29ª may be laid within the lips or tongues 30ᵇ of the rings 30ª and nails or wedges 30ᶜ driven between the rings and the periphery of the post at points diametrically opposite said tongues or lips. The effect of driving the nails between the rings and post is to draw the lips or tongues into close proximity with the post and into such positions that they will embrace and retain the strand-wires at the desired elevations or distances of separation relative to each other. When the wires are attached to the posts by means of the rings, as shown, said wires may be stretched or tightened by longitudinal strain applied thereto, since they will slip through the spaces between the lips and posts under such strain as is necessary to draw the wires tight.

In a fence erected in any location through the use of either form of post herein described the upper portions of the posts may be inclined relative to the lower portions and toward or leaning over the surface of a field used as a pasture or lot for cattle, horses, or other live stock, and in such inclined position the uppermost of the series of wires will resist the approach of the larger animals to the fence and prevent the damage that otherwise might be occasioned by said animals pawing the fence and sawing their fore legs on the lower wires. Again, when the posts above described are employed the fence may be laid down prone upon the ground and a vehicle or implement driven or hauled over the recumbent fence without material damage to either.

I claim as my invention—

1. The fence-post, comprising the stake formed with an attenuated lower end portion to be driven into the ground, the wings projecting laterally from the faces of said stake, the hinge-plates mounted on opposite sides of the stake and pivoted for revolution on a common axis extended through said stake, which hinge-plates are of less length than the stake, and a post removably and replaceably mounted between the upper portions of said hinge-plates and extending upwardly therefrom.

2. The fence-post, comprising the stake, the hinge-plates mounted on opposite sides of the upper end of said stake and arranged for oscillation and vertical rectilinear reciprocation thereon, which hinged plates are shaped to form a socket at their upper ends and a post seated in said socket and secured to said plates, which post is separate from and forms no part of the plates.

3. The stake, the studs therein, the hinge-plates formed with slots longitudinally thereof and pivoted on a fulcrum traversing the stake and said slots and also formed with notches to engage said studs and a post carried by said hinge-plates.

4. The stake, wings formed on said stake and extending laterally therefrom, studs projecting laterally from said stake above the wings, a bolt mounted in said stake above and parallel with the studs, plates formed with notches in their lower ends arranged to engage said studs at times and also formed with slots longitudinally of their central portions and arranged for the reception of said bolt, which plates are offset outwardly in their central portions to form a socket between their upper ends and a post seated in said socket and fixed to said plates.

5. The stake, wings formed on said stake and extending laterally therefrom, studs projecting laterally from said stake above the wings, a bolt mounted in said stake above and parallel with the studs, plates formed with notches in their lower ends arranged to engage said studs at times and also formed with slots longitudinally of their central portions and arranged for the reception of said bolt, which plates are offset outwardly in their central portions to form a socket between their upper ends and a post seated in said socket and fixed to said plates, together with means for attaching fence-wires to said post.

Signed at Des Moines, Iowa, March 26, 1900.

CHARLES R. PRICE.

Witnesses:
G. C. FOOTE,
S. C. SWEET.